United States Patent [19]

Confer et al.

[11] 3,989,442
[45] Nov. 2, 1976

[54] APPARATUS FOR BLOW MOLDING THERMOPLASTIC MATERIAL

[75] Inventors: Raymond C. Confer, Gasport, N.Y.; Floyd H. Talmon, Fairview Park, Ohio

[73] Assignee: Air-Lock Plastics, Inc., Tonawanda, N.Y.

[22] Filed: June 5, 1973

[21] Appl. No.: 367,111

Related U.S. Application Data

[62] Division of Ser. No. 21,944, March 23, 1970, Pat. No. 3,742,995.

[52] U.S. Cl. .................. 425/503; 425/DIG. 214
[51] Int. Cl.² ............... B29D 3/00; B29D 23/03
[58] Field of Search .......... 425/DIG. 214, 503, 117, 425/326 B; 264/275

[56] References Cited
UNITED STATES PATENTS

| | | | |
|---|---|---|---|
| 2,349,177 | 5/1944 | Kopitke | 425/326 B |
| 3,101,993 | 8/1963 | Cohn | 425/DIG. 214 |
| 3,109,203 | 11/1963 | Moorman | 425/DIG. 214 |
| 3,204,959 | 9/1965 | Nicholls | 249/97 X |
| 3,325,031 | 6/1967 | Singier | 215/37 |
| 3,452,125 | 6/1969 | Schurman et al. | 425/DIG. 214 |
| 3,457,337 | 7/1969 | Turner | 425/DIG. 214 |
| 3,575,949 | 4/1971 | Humphrey | 425/DIG. 214 |

FOREIGN PATENTS OR APPLICATIONS 1,251,009  9/1967  Germany

Primary Examiner—Francis S. Husar
Assistant Examiner—David S. Safran
Attorney, Agent, or Firm—Christel & Bean

[57] ABSTRACT

A method of and apparatus for blow molding an article having an insert permanently affixed thereto. The insert is placed on a removable member insertable through a wall of a mold section for positioning the insert in spaced relation to a mold cavity wall. An extruded parison is fed between complementary mold sections which are closed about the parison for enclosing a portion of the same. Air is introduced into the enclosed parison to expand the same into conformity with the cavity defined by the mold sections and the insert. Plastic material flows into the spacing between the insert and mold cavity wall to partially encapsulate the insert in sealed, interlocked relation to the wall of the plastic article.

4 Claims, 8 Drawing Figures

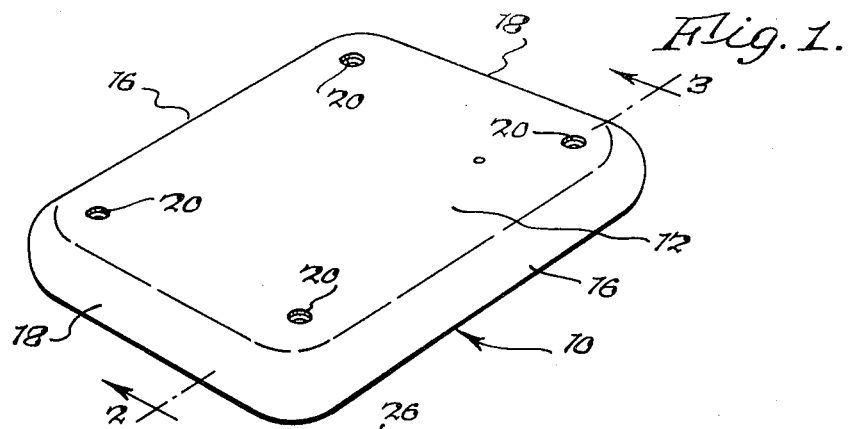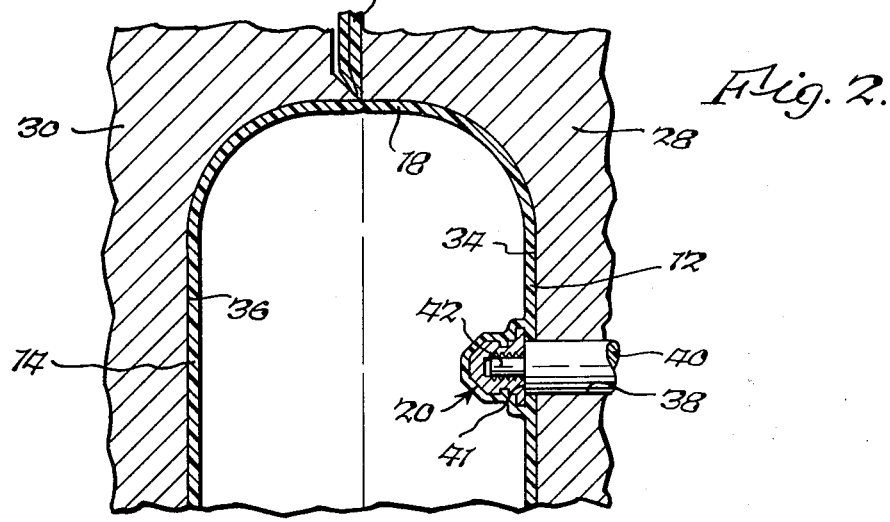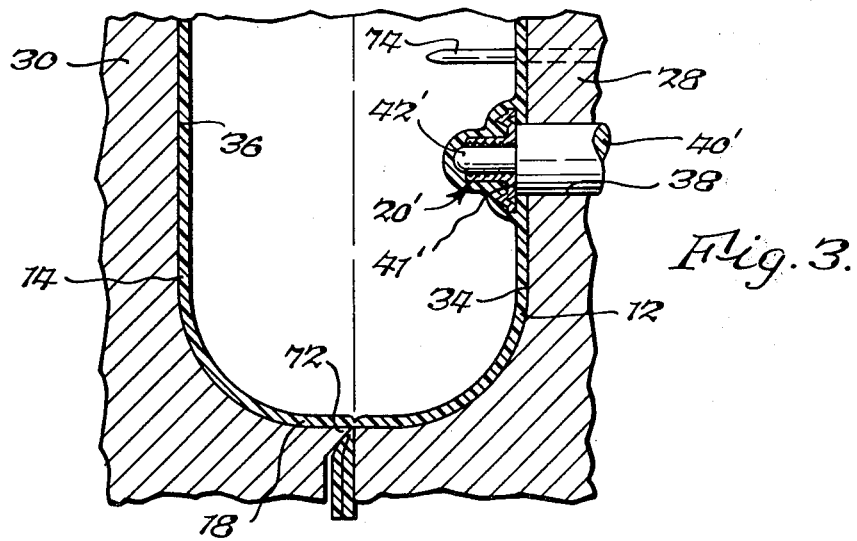

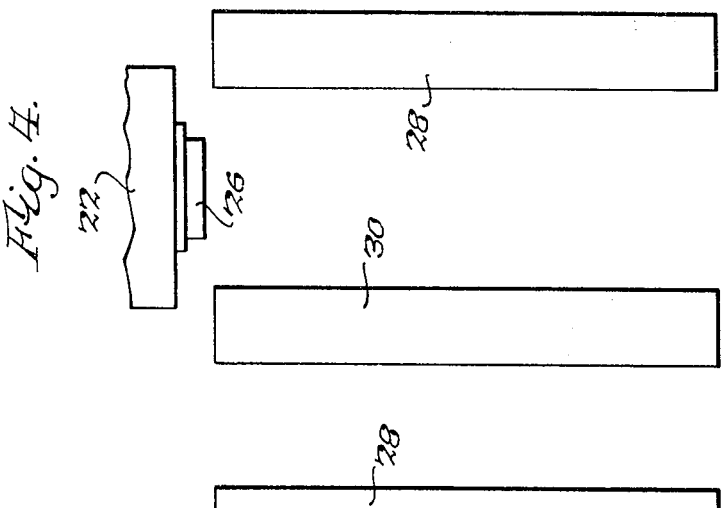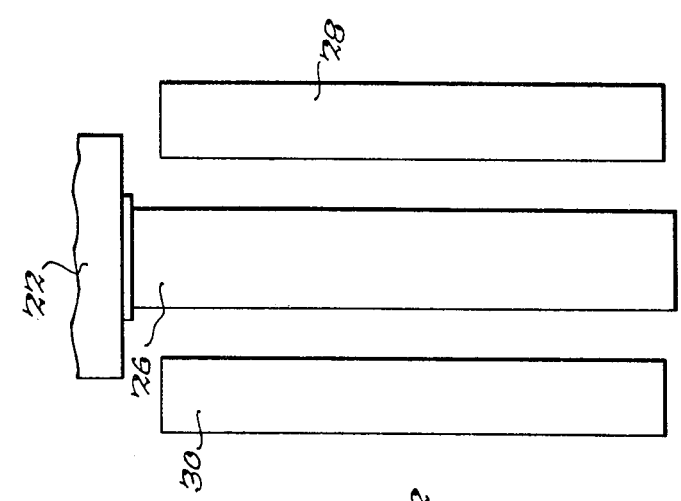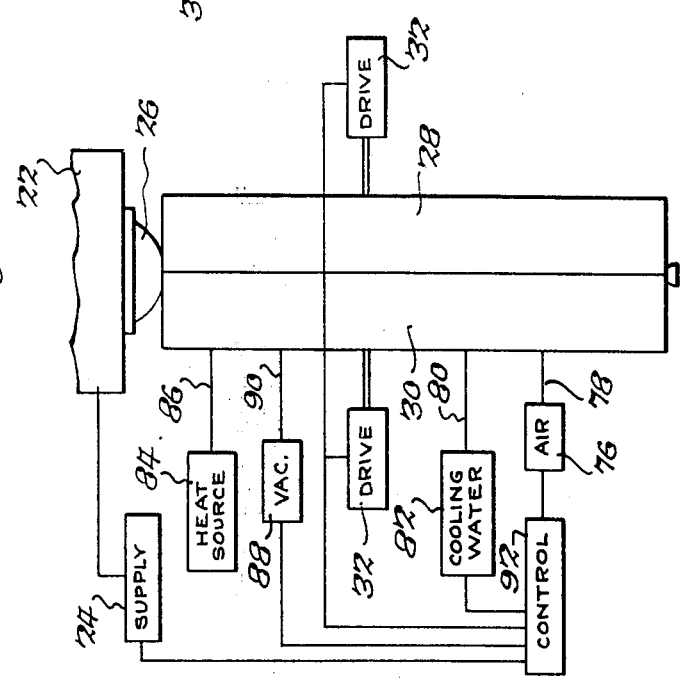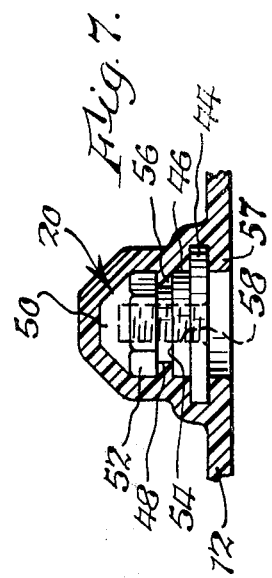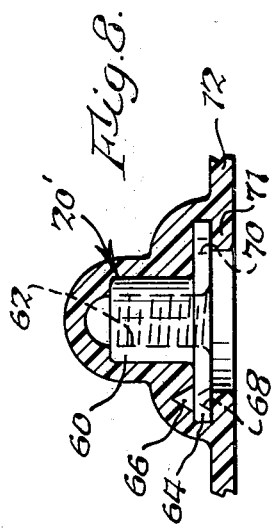

3,989,442

APPARATUS FOR BLOW MOLDING THERMOPLASTIC MATERIAL

CROSS REFERENCE TO A RELATED APPLICATION

This application is a division of pending application Ser. No. 21,944 filed Mar. 23, 1970, now U.S. Pat. No. 3,742,995 issued July 3, 1973.

BACKGROUND OF THE INVENTION

The present invention relates generally to the blow molding of thermoplastic material and, more particularly, to a method of and apparatus for blow molding plastic articles having inserts permanently affixed thereto while maintaining the integrity of the wall surfaces of the article.

In molded plastic articles, such as storage tanks, containers and the like, it is sometimes desirable to provide inserts, such as fittings, sockets, nuts and the like, in the walls of these plastic articles for attaching the same to other support structure or for connecting valves, hose and conduit couplings or other members thereto. Conventionally, these inserts are fitted into the plastic article after it has been formed by pinning the insert therein or by employing separable fasteners to secure the inserts in place. Not only is this a time-consuming and expensive procedure requiring a number of parts, but the wall surfaces of the plastic article are necessarily punctured and pierced, thereby interrupting the integrity of such wall surfaces. Providing and maintaining a fluid-tight seal about the insert presents a problem. Also, a problem is encountered in rigidly affixing these inserts to the wall surfaces in order to preclude displacement or removal of such inserts from their original positions.

SUMMARY OF THE INVENTION

It is an object of the present invention to provide an improved method of molding plastic articles having inserts permanently affixed thereto while maintaining the integrity of the article walls.

It is another object of the present invention to provide an improved apparatus for molding plastic articles into shape having inserts permanently affixed thereto and interlocked therewith as an integral part of the finished article.

It is a further object of the present invention to provide the foregoing apparatus with means for releasably mounting and positioning inserts thereon prior to the molding operation.

The foregoing and other objects, advantages, and characterizing features of the present invention will become clearly apparent from the ensuing detailed description thereof, considered in conjunction with the accompanying drawings wherein like reference numerals denote like parts throughout the various views.

BRIEF DESCRIPTION OF THE DRAWINGS

FIG. 1 is a perspective view of an illustrative plastic molded article formed by the method and apparatus of this invention;

FIG. 2 is a fragmentary, vertical sectional view taken through the upper portion of a mold assembly of this invention;

FIG. 3 is a fragmentary, vertical sectional view taken through the lower portion of a mold assembly of this invention;

FIGS. 4 and 5 are schematic views illustrating the mold parts of this invention relative to different positions of the tubular parison;

FIG. 6 is a schematic layout of a complete apparatus of this invention;

FIG. 7 is a fragmentary sectional view through a portion of the wall of a molded plastic article showing one type of insert permanently affixed thereto; and FIG. 8 is a view similar to FIG. 7 but illustrating another form of insert.

DETAILED DESCRIPTION OF A PREFERRED EMBODIMENT

Referring now to the accompanying drawings, there is shown apparatus of this invention for producing hollow plastic articles, especially containers, having inserts integrally formed therewith. One illustrative form of article produced by the method and apparatus of this invention is a container, generally designated 10 and shown in FIG. 1. Container 10 is of a unitary, one-piece construction, formed of a thermoplastic material, such as polyethylene for example, and comprises a front wall 12, a rear wall 14, opposite side walls 16 and opposite end walls 18. Although container 10 of the illustrative embodiment is of a generally flat, rectangularly shaped configuration, it should be understood that such container can take various shapes and sizes and have protrusions and/or recesses embossed on any of the walls, as desired.

A plurality of inserts 20 are mounted in front wall 12. These inserts may take any form, such as pipe fittings, nuts, washers, fasteners of any suitable type, or any combination of these, the specific insert employed being dictated by the particular application of the finished article. In the embodiment illustrated in FIG. 1, inserts 20 are nuts for receiving bolts used to attach a metal plate to the outer flat surface of front wall 12.

In accordance with the present invention, inserts 20 are molded integrally with container 19 by a blow molding technique as follows:

With reference to FIGS. 4–6, a molten plastic material, such as plasticized polyethylene for example, is fed into an extrusion die 22 by conventional feed means, not shown, from a suitable supply 24 (FIG. 6). The molten plastic material is extruded from die 22 as a tubular parison 26 of a laterally elongated, flat-sided form approximating the shape of the container to be molded. Parison 26 is gravity fed downwardly between mold sections 28 and 30 which are mounted for movement into and out of engagement about parison 26. Mold sections 28 and 30 can be pivotally mounted or otherwise supported and can be moved by conventional drive means 32. The free end of parison 26 is disposed below the lower ends of mold sections 28 and 30 before such sections engage parison 26 to insure that the enclosed portion of parison 26 extends from the top to the bottom of said mold sections 28 and 30.

Mold sections 28 and 30 are provided with cavities 34 and 36, respectively, (FIGS. 2 and 3). When mold sections 28 and 30 are engaged, cavities 34 and 36 form a mold cavity defining the outer surface configuration of the finished container 10.

Mold section 28 is provided with a plurality of apertures 38 (only one is shown in FIGS. 2 and 3) through which are inserted removable pins 40 having studs 42 projecting axially from the free ends thereof into the mold cavity. Inserts 20 are positioned on studs 42 prior to the mold closing operation. Pins 40 extend slightly inwardly of the mold cavity wall and have faces 41 against which inserts 20 abut. Thus, a clearance space approximating the wall thickness of the finished article is provided between insert 20 and the mold cavity wall.

FIG. 3 illustrates a pin 40' of a larger diameter than pin 40 having a stud 42' of a different size and configuration from stud 42. The sizes and shapes of pins 40, 40' and studs 42, 42' can vary within the purview of this invention, as dictated by the particular type of insert provided. Also, it should be understood that any desired number of apertures 38 and pins 40 arranged in any suitable pattern can be provided in either mold section, or both mold sections, as desired.

In the particular embodiment illustrated in FIGS. 2 and 7, insert 20 comprises a nut having a generally annular flange 44, a pair of stepped, indented portions 46 and 48, and an inner portion 50 having a peripheral polygon surface 52 projecting laterally outwardly of portion 48 to form between portions 46 and 52 an annular recess 54 for receiving molten plastic material therein to form a mechanical locking ring 56. During the molding operation, molten plastic material also flows about a portion of the outer surface of flange 44 between it and cavity wall 34 forming an outer mechanical locking ring 57 to further secure insert 20 in place. The plastic material disposed about polygon surface 52 also forms a mechanical lock preventing rotation of insert 20 within its plastic sheathing. A threaded bore 58 extends axially into the body of insert 20 for receiving a suitable bolt.

Insert 20', shown in FIGS. 3 and 8, comprises a nut having a body portion 60 provided with a threaded bore 62. A circular flange 64 projects laterally outwardly from body portion 60 and is provided with a series of conical projections 66 struck out of flange 64 to form corresponding depressions 68 therein. Also, a series of openings 70 extend through flange 64. During the molding operation, molten plastic material flows into depressions 68 and into and through openings 70 and about projections 66 to provide a mechanical lock securing insert 20' in place. Also, molten plastic material flows about a peripheral portion of the outer surface of flange 64 between it and cavity face 34 forming an outer mechanical locking ring 71 to further secure insert 20' in place and prevent axial displacement or removal thereof.

Mold section 30 is provided with a knife-edge formation 72 extending completely around mold cavity 36 and is adapted to engage against mold section 28, which serves as a bed plate, for severing and enclosing a portion of parison 26. If desired, mold section 28 can be provided with a knife-edge formation rather than mold section 30 or both mold sections 28 and 30 can have knife-edge formations which engage to sever a portion of parison 26. Thus, upon closing of mold sections 28 and 30 about parison 26, a portion thereof is severed and enclosed within mold sections 28 and 30.

Mold sections 28 carries means for introducing expansion fluid into the enclosed parison portion, such means comprising a needle 74 which is mounted in section 28 and projects inwardly of the cavity defining face thereof through the wall of the enclosed parison. A source of compressed air 76 is connected via conduit 78 to needle 74 for introducing compressed air into the enclosed, hollow parison expanding the same into engagement with the mold cavity walls, causing the enclosed parison to assume the shape of the cavity as shown in FIGS. 2 and 3. The thermoplastic material also flows about the entire body portion of the inserts to completely encapsulate or encase the same with a sheet of thermoplastic material. As shown in FIGS. 7 and 8, the thermoplastic material flows into recess 54 of insert 20 and into depressions 68 and openings 70 of insert 20' to lock such inserts within the wall of the finished article. Also, the thermoplastic material flows around flanges 44 and 64 up to removable pins 40 and 40' to further lock the inserts in place.

Mold sections 28 and 30 are then cooled, as by means of cooling water ducts 80 connected to a suitable source of cooling water 82. This cools and sets the molded plastic, causing it to retain the mold configuration. After the plastic material has set sufficiently to become self-supporting, pins 40 and 40' are removed providing access openings to inserts 20 and 20'. Mold sections 28 and 30 are opened leaving the finished article with inserts 20, 20' permanently affixed thereto while maintaining the wall integrity of the finished article. The container wall, being continuous, is just as fluid tight as though the insert were not therein. The outer wall surface of container 10 remains substantially continuous while the inserts are somewhat recessed from the plane of the container wall and permanently sealed therein.

In order to maintain the plastic material of parison 26 within mold sections 28 and 30 in a molten, semi-fluid condition prior to cooling, mold sections 28 and 30 are heated by heating elements (not shown) enclosed in the walls of mold sections 28 and 30 and connected to a suitable heat source 84 via line 86. In this manner, the enclosed parison is maintained at or near its plasticizing temperature to facilitate the expansion thereof against the mold cavity walls and to aid in the pinching and severing of the enclosed parison without requiring special cutting equipment or excessive forces to cut through a cooled plastic.

If desired, a vacuum source 88 can be connected to mold sections 28 and 30 via conduit 90 to withdraw air from between the enclosed parison and the cavity walls of mold sections 28 and 30. A strong suction force is not necessary, and mere venting often will suffice. The suction force is merely to relieve the pressure of any air that might be trapped between parison 26 and the cavity walls of mold sections 28 and 30, which trapped air would tend to prevent the parison from following the contour of cavities 34 and 36 of mold sections 28 and 30 engaged about parison 26. The passages establishing communication with the mold section cavities 34 and 36 are so small as to preclude the admittance of molten thermoplastic material therein, while being sufficient to permit the desired withdrawal of air. Such withdrawal takes place as mold sections 28 and 30 close about the extruded parison 60 prior to the introduction of expansion fluid through needle 74. The introduction of expansion fluid into the enclosed parison causes the same to expand into conformance with the cavity wall defining surfaces of mold sections 28 and 30. Undesirable inward collapsing of the parison wall is avoided by the force of the expansion fluid and the elimination of air between parison 26 and mold sections 28 and 30.

The feeding of the raw plastic material into extrusion die 22, the parison extruding operation, the opening and closing of mold sections 52 and 54 and the heating and cooling thereof, the withdrawal of air from between parison 26 and the cavity walls of mold sections 52 and 54, and the introduction of expansion fluid all are controlled in a timed relationship by suitable programming or control means 92. Since such controls are conventional, in and of themselves, they are only schematically shown in FIG. 6 and it is believed that no further description or amplification is necessary. Indeed, the entire showing in FIG. 6 is schematic only.

Although the plastic material used in the above described molding operation preferably is polyethylene, it should be understood that any suitable thermoplastic material can be used, as desired. Also, as earlier mentioned, this invention is not restricted to a method of and apparatus for forming a container as shown in FIG. 1 nor limited to the particular inserts shown in the drawings, but has utility in forming any configurated plastic article to which it is desired to permanently affix any suitable insert.

It should be noted that a similar type mold but of lesser thickness, employing removable pins 40, 40' to temporarily mount inserts thereon, can be used to produce plastic molded articles by a technique known as rotational molding whereby a heated mold is rotated to disperse a plastic material injected into the mold in powder form against the walls of the mold cavity. As the powdered plastic material engages the heated mold cavity walls, it melts and adheres thereto to form a uniform layer of plastic material about the cavity defining walls.

From the foregoing, it is apparent that the objects of the present invention have been fully accomplished. As a result of this invention, an improved method and apparatus is provided for molding a plastic article into shape and permanently affixing inserts thereto in an interlocked relation with such plastic article while maintaining the wall integrity of the finished article.

Specific forms of this invention having been described in detail, it is to be understood that this has been done by way of illustration only.

We claim:

1. A blow molding apparatus for forming a hollow article having at least one insert permanently affixed thereto comprising: mold sections which when engaged form a mold cavity, an insert having an apertured surface within the cavity, means extending through an aperture in the wall of at least one of said mold sections for releasably mounting said insert with the apertured surface in spaced relation to an adjacent cavity wall with a minimum sliding clearance being provided between said means and said mold wall aperture, said insert mounting means comprising a pin of lesser diameter than said apertured surface and having an end face projecting slightly inwardly of the wall of said mold cavity and an extension portion having a diameter less than the diameter of said pin and being adapted to be slidably received in the insert aperture for mounting of the insert so that said end face of said pin abuts the surface of the insert to overlap the aperture therein, the wall portion of said mold section encircling and defining said aperture therein having a uniform, uninterrupted surface with respect to the remainder of the adjacent mold section wall, and said mounting means being releasable away from the insert in a slidable manner upon undergoing relative linear movement with respect to the insert in a direction toward the adjacent cavity wall, means associated with said mold sections for forming a hollow parison of thermoplastic material, means operatively connected to said mold sections for closing said mold sections about said parison to enclose a portion thereof, one of said mold sections having fluid conducting means, and means associated with said conducting means for introducing fluid through said fluid conducting means into said enclosed parison portion to expand the same into conformity with said cavity and about said insert with some of the material flowing around said pin between a portion of the apertured surface of the insert and the adjacent cavity wall, thereby partially encapsulating said insert with substantially none of the material flowing into or through the surface of said mold section wall encircling said pin and aperture defined therein.

2. A blow molding apparatus as set forth in claim 1 wherein said insert has a flange which has at least one opening therein so that thermoplastic material may flow into the opening and partially about the outer side of said flange to interlock the same with the molded article.

3. A blow molding apparatus as set forth in claim 1 wherein at least one of said mold sections has a knife edge formation extending completely around the cavity of said one mold section.

4. A blow molding apparatus as set forth in claim 1 including means operatively associated with said mold sections for heating said mold sections, cooling said mold sections, and evacuating air from the space between the parison and said mold sections.

* * * * *